(12) United States Patent
Birnbach (10) Patent No.: US 6,842,573 B2
(45) Date of Patent: Jan. 11, 2005

(54) DIRECTIONAL OPTICAL COUPLER (75) Inventor: Curtis Alan Birnbach, New Rochelle, NY (US)

(73) Assignee: Hudson Research Inc., New Rochelle, NY (US)

( * ) Notice: Subject to any disclaimer, the term of this patent is extended or adjusted under 35 U.S.C. 154(b) by 78 days.

(21) Appl. No.: 10/189,951

(22) Filed: Jul. 3, 2002

(65) Prior Publication Data

US 2003/0021540 A1 Jan. 30, 2003

Related U.S. Application Data

(60) Provisional application No. 60/303,015, filed on Jul. 5, 2001, and provisional application No. 60/305,575, filed on Jul. 16, 2001.

(51) Int. Cl.[7] .............................. G02F 1/295; G02B 6/35
(52) U.S. Cl. ................. 385/50; 385/9; 385/17; 385/41; 359/322

(58) Field of Search .......................... 385/8, 9, 17, 40, 385/41, 50; 359/315, 321, 322

(56) References Cited

U.S. PATENT DOCUMENTS

| | | | | |
|---|---|---|---|---|
| 5,862,276 A | * | 1/1999 | Karras | 385/50 |
| 6,118,571 A | * | 9/2000 | Wessels et al. | 359/245 |
| 6,208,453 B1 | * | 3/2001 | Wessels et al. | 359/321 |

* cited by examiner

*Primary Examiner*—Akm Enayet Ullah
*Assistant Examiner*—Omar Rojas
(74) *Attorney, Agent, or Firm*—Ostrolenk, Faber, Gerb & Soffen, LLP (57) ABSTRACT

A directional optical coupler is shown and described, which includes an optical cell that is made of a first transparent conductor, a second transparent conductor and an electro-optical member interposed between the two transparent conductors, the electro-optical member having an index of refraction which can be varied only along one crystal axis by application of an electric field.

11 Claims, 5 Drawing Sheets

DIRECTIONAL OPTICAL COUPLER

CROSS REFERENCE AND CLAIM OF PRIORITY

This application claims priority to U.S. Provisional Application No. 60/303,015, filed Jul. 5, 2001, entitled METHOD AND APPARATUS FOR DEFLECTING AND DISPLACING OPTICAL SIGNALS, and U.S. Provisional Application No. 60/305,575, filed Jul. 16, 2001, entitled TUNNELING OPTICAL MATRIX SWITCHING TECHNIQUE AND METHOD OF MANUFACTURE, the disclosures of which are hereby incorporated by reference.

BACKGROUND AND SUMMARY OF THE INVENTION

The present invention relates to an optical coupler and more specifically to a directional optical coupler that includes an electro-optic member having an index of refraction that can be varied by application of an electric field.

Optical couplers are well known devices used to direct light from one light source to a light receiving member. In a known variety of optical couplers a layer of material is used which changes its index of refraction upon application of an electric field. The change in the index of refraction of the material so used in the prior art devices causes the light that is transmitted therethrough to change direction. The material used in this variety of optical couplers is anisotropic and thus exhibits significant index of refraction changes in more than one crystal axis.

A directional optical coupler in the present invention includes an optical cell that is comprised of a pair of opposing optically transparent conductors and an index of refraction variable layer interposed between the two optically transparent conductors. The index of refraction variable used in an optical cell according to the present invention exhibits a significant index of refraction variation along only one crystal axis upon application of an electric field and a negligible or no change in the index of refraction in other crystal axes. Thus, a light that is displaced by an optical cell according to the present invention will not have a changed polarization vector.

A directional optical coupler according to the present invention may include one optical cell or two or more optical cells as described above disposed on a suitable substrate such as a glass substrate.

A directional optical coupler according to the present invention may be used in conjunction with a number of different conventional optical devices such as reflective separation multipliers as part of a multiplexer/demutiplexer device or a scanner.

In addition, an optical cell according to the present invention may be interposed between two planar waveguides in order to act as a switch to make tunneling possible or to prevent tunneling between the two planar waveguides so as to act as switch therebetween. Such an arrangement may then be used in a tunneling optical matrix to allow for switching of light between a plurality of planar waveguides.

Other features and advantages of the present invention will become apparent from the following description of the invention which refers to the accompanying drawings.

DETAILED DESCRIPTION OF EMBODIMENTS

Figure 1:
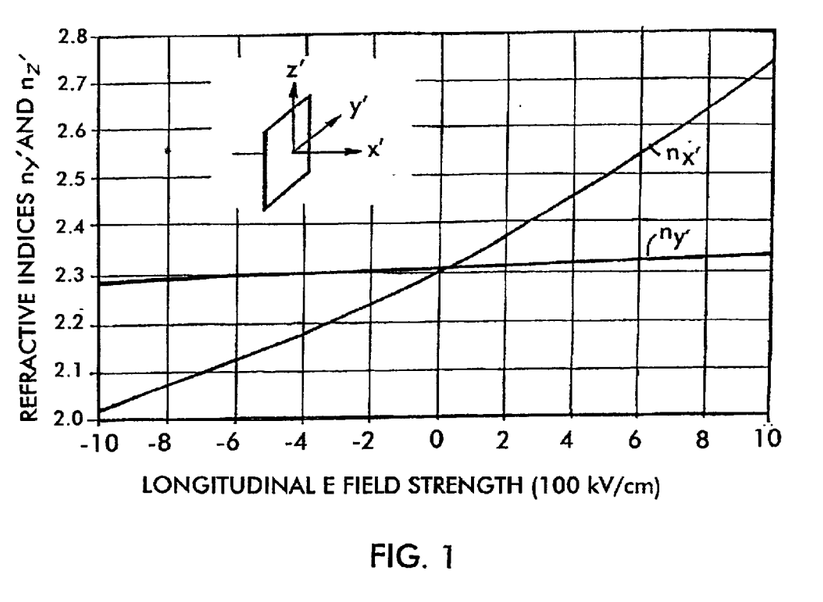
FIG. 1 graphically shows the variation of the index of refraction upon application of an electric field along two crystal axes in a material used in an optical cell according to the present invention.

A directional coupler according to the present invention makes use of an electro-optic material having an index of refraction which can be varied by the application of an electric field. FIG. 1 illustrates the electro-optical behavior of such a material under the application of a voltage. As shown in FIG. 1, varying the applied voltage causes a substantially linear change in the refractive index of the material in one crystal axis, e.g., the x crystal axis, while the application of voltage causes little change in the index of refraction of the material in another crystal axis, e.g., the y crystal axis.

In the specific example that is shown by FIG. 1, the index of refraction in the x crystal axis changes substantially linearly between about 2.0 to about 2.75 as the electric field changes between about −1000 kV/cm to about 1000 kV/cm. However, the index of refraction in the y crystal axis changes only slightly from about 2.29 to about 2.32 for the same range of applied electric field. Thus, the change in the index of refraction in the x crystal axis is twenty five times that of the change in that of the y crystal axis. In other words, the change in the index of refraction in the y axis is 0.0015 per every 100 kV/cm; whereas, the change in x crystal axis 0.0375 per every 100 kV/cm. Such a difference between the variation in the index of refraction makes it possible to treat the change in the index of refraction of one crystal axis as insignificant or non-existent, particularly when the applied voltage is low. For example, a change of 100 kV/cm will only change the index of refraction in the y direction by 0.0015, which is very negligible; while the same voltage will increase the index of refraction along the x crystal axis by 0.0375, which is comparatively significant. Thus, there is a substantial change in the index of refraction in the x crystal axis of more than ten times that of the y crystal axis. This makes the change in the index of refraction in the y crystal axis comparatively negligible.

Such an optical property may be found only in some materials. For example, in an electro-optic material such as Strontium Barium Niobate (SBN), the electro-optical property described above can be observed along the R33 axis of the crystal. That is, along the R33 direction in SBN the refractive index can be substantially changed along one crystal axis by application of an electric field, while the other crystal axis-remains axes remain substantially unaffected. Because of the property described above with reference to FIG. 1, the polarization vector of light does not change when an electric field is applied. More importantly, due to the negligible or essentially non-existent change in the index of refraction of other crystal axes interaction of light with other crystal axes can be minimized thus better control can be obtained over the operation of the optical device.

Figure 2:
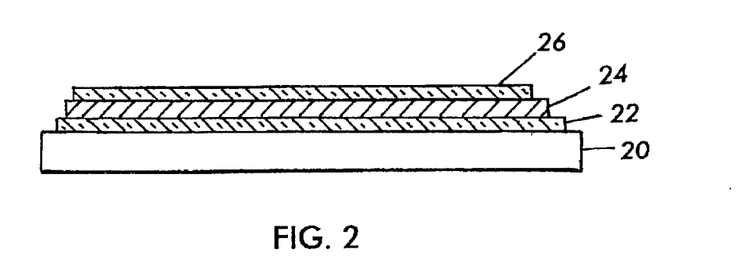
FIG. 2 shows a cross-sectional view of a directional optical coupler according to a first embodiment of the present invention.

Referring now to FIG. 2, a directional optical coupler according to a preferred embodiment of the present invention includes: a planar substrate 20, which may be composed of glass, or silicon, or any other suitable material; first transparent conductor 22, which is preferably composed of Indium-Tin oxide, or any other suitable material, disposed over planar substrate 20; index of refraction variable layer 24 that exhibits a substantial variation in its index of refraction only for one crystal axis upon application of an electric field and little or no variation in its index of refraction for other crystal axes; and second transparent conductor 26 composed preferably of the same material as that of first transparent conductor 22 and disposed over index of refraction variable layer 24 opposite first transparent conductor 22. The combination of first transparent electrode 22, index of refraction variable layer 24, and second transparent electrode 26 constitute an optical cell according to the present invention which may be disposed and incorporated with other elements other than substrate 20. Preferably, index of refraction variable layer 24 is composed of SBN which is oriented in a direction that exhibits significant variation in its index of refraction only in one crystal axis. SBN is a particularly desirable material in that it can be useful for electromagnetic waves that fall in the range 380 nanometers to 4 micrometers, which is a broad spectrum, thus allowing an optical cell according to the present invention to operate in a rather wide band. However, the invention may not be limited to SBN and other suitable materials may be used to construct an optical cell according to the present invention, provided that the material exhibits the variable index of refraction property substantially along one crystal axis while it does not exhibit a significant variable index of refraction along other axes. Other suitable material may be found among ternary or quaternary optical materials as well as other optical materials.

An optical cell according to the present invention is operated by applying a bias voltage to first transparent conductor 22 and second transparent conductor 26. The application of a bias voltage creates an electric field which will change the index of refraction of index of refraction variable layer 24 along one crystal axis, but will not have a substantial effect on other crystal axes. Therefore, light that is transmitted through index of refraction variable layer 24 will change direction, but will not have its polarization vector substantially changed. This may be specially true if the applied electric field is not great.

Referring back to FIG. 1, if the applied electric field is chosen so that the index of refraction in one direction is great while the change in the index of refraction in the other direction is infinitesimal, very little change, if any, will be observed in the polarization vector. For example, if the electric field is changed from −400 kV/cm to −200 kV/cm, the index of refraction in the x crystal axis changes from 2.17 to 2.5, while comparatively very little, if any, change is observed in the y crystal axis. Thus, by properly choosing the applied electric field, the change in the index of refraction in one crystal axis can be drastically reduced or kept near zero, while the index of refraction of another axis can be changed substantially.

Figure 3:
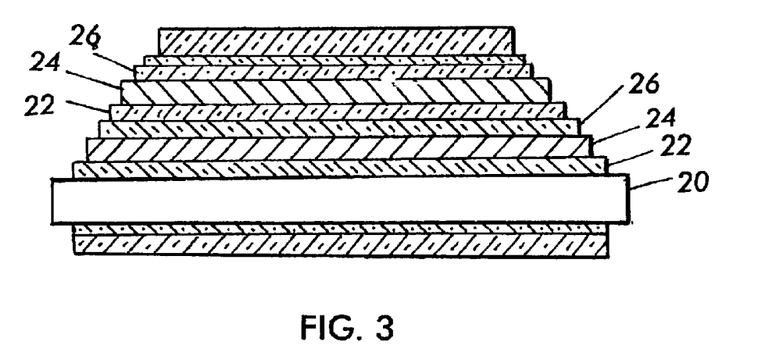
FIG. 3 shows a cross-sectional view of a directional optical coupler according to a second embodiment of the present invention.

Limiting the range of the applied electric field in order to minimize or depress the change in the index of refraction of one of the crystal axes, however, does not limit the capability of an optical cell according to the present invention in that, according to another embodiment of the present invention, if more displacement is desired, two or more optical cells can be stacked on top of one another in order to provide the desired light displacement without incurring any substantial change in another crystal axis. FIG. 3, in which like numerals identify like features according to the earlier description provided above, shows an optical coupler according to a second embodiment of the present invention. The directional coupler shown by FIG. 3 includes two optical cells according to the present invention, one of which is disposed on top of the other. As explained above, each one of the optical cells shown in FIG. 3 can be operated in a relatively narrow electric field range, thereby exhibiting a relatively substantial change in one crystal axis, while showing an infinitesimal change or no change in another crystal axis. Thus, each optical cell can cause part of the desired displacement of light, without changing the polarization vector of the light. Using the configuration shown in FIG. 3, two or more optical cells can be stacked on top of one another to achieve higher cumulative displacements without any change in the polarization vector.

A directional optical coupler according to the present invention can also be combined with other optical elements to obtain many other optical devices. For example, as shown in FIG. 4, directional optical coupler according to the first embodiment of the present invention may be used in conjunction with a reflective separation multiplier to obtain deviations in the order of tens of degrees, thereby allowing an optical cell according to the present invention to be integrated with fiber optics and used in such applications as multiplexing/demultiplexing in, for example, telecommunication routers, whereby an optical signal can be selectively routed from input port to another port.

Figure 4:
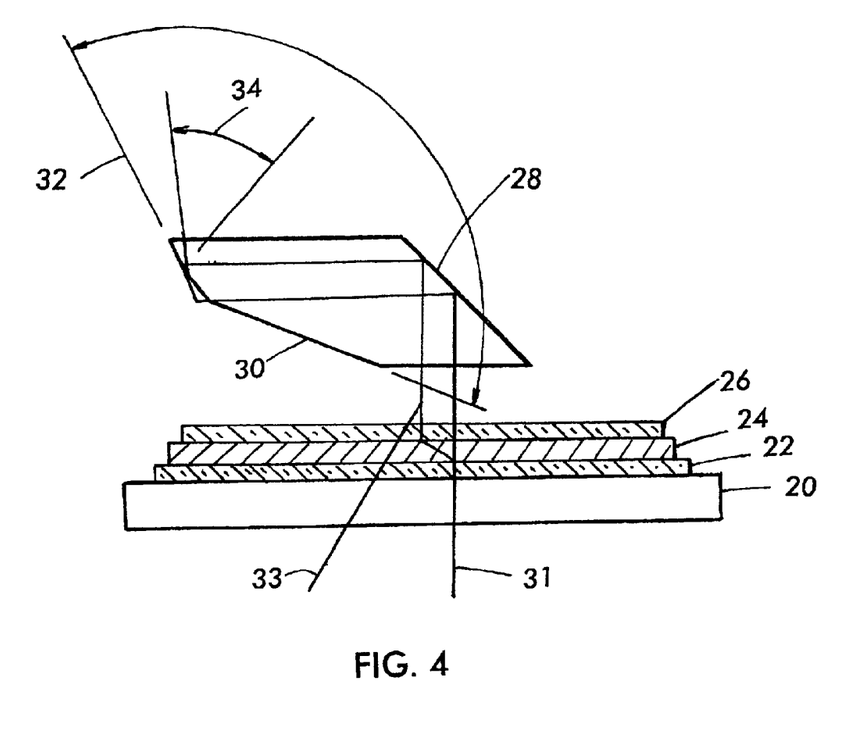
FIG. 4 shows a directional optical coupler according to the first embodiment of the present invention with a reflective separation multiplier of a first variety.

Referring to FIG. 4 specifically, a reflection separation multiplier comprising of first mirror 28, second mirror 30, and third mirror 32 can be disposed near but spaced by an air gap from a directional optical coupler according to the present invention. First mirror 30 in the reflective separation multiplier is substantially flat and disposed opposite second mirror 30 and third mirror 32, which are also substantially flat and angularly spaced from one another. Mirrors 28, 30, 32 may be formed on facets of an optical device such as prism. A normal ray 31 of light emerging from an optical cell according to the present invention is reflected from first mirror 28 onto second mirror 30 and reflected therefrom at an angle. A displaced ray of light 33 that has been displaced by application of an electric field is reflected from first mirror 28 at a different point onto third mirror 32 and then reflected therefrom at an angle different from that of normal ray 31. The angular difference 34 between normal ray 31 and displaced ray of light 33 allows the two lights to be directed to two different points. Using such an arrangement, a multiplexer/demultiplexer may be constructed by, for example, directing the normal ray 31 to one optical fiber (not shown) and the displaced ray 33 to another optical fiber (not shown) to demultiplex or receiving light from one fiber and receiving light from another fiber and directing the two into a common fiber (not shown) in a reverse order to multiplex.

Also using the arrangement shown in FIG. 4 a scanner may be devised. The reflective separation multiplier shown in FIG. 4 is particularly useful in fuzzy logic or thresholding applications or other applications in that light may be reflected from a relatively large number of points on first mirror 28 to second mirror 30 and avoid reflection toward third mirror 32 where it may be angularly spaced relevant to another ray of light. Thus, a margin of error can be assigned to the application of an electric field to the optical cell according to the present, which in turn allows one, for example, to devise a thresholding type application whereby the crossing of a threshold is indicated when light is reflected off of third mirror 32.

Figure 5:
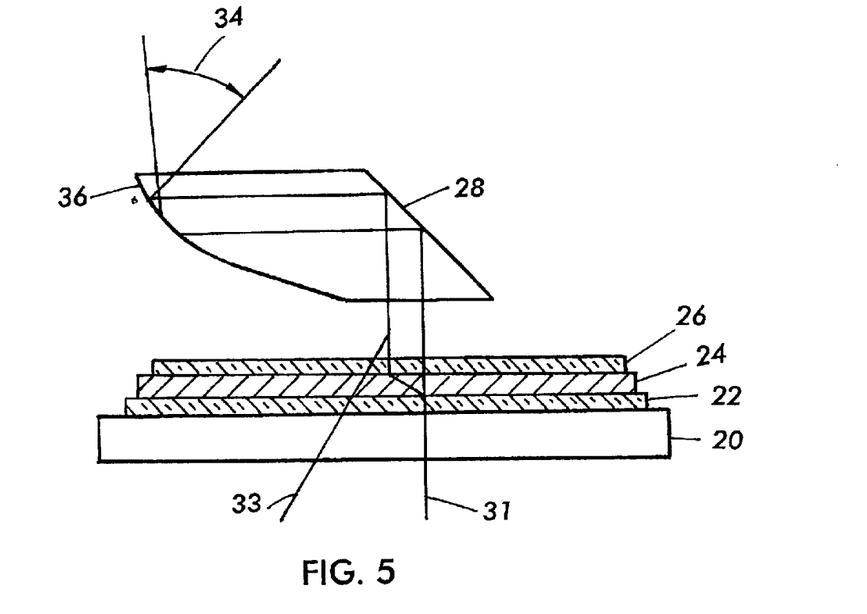
FIG. 5 shows a directional optical coupler according to the first embodiment of the present invention with a reflective separation multiplier of a second variety.

FIG. 5 shows another arrangement which may be used to construct a multiplexer/demultiplexer. Referring to FIG. 5, a reflective separation multiplier, comprising of first mirror 28 and first curved mirror 36, is disposed near and spaced by an air gap from an optical cell according to the present invention. First mirror 28 and first curved mirror 36 may be mirrors on faces of an optical element such as a prism.

A normal ray 31 of light emerging from an optical cell according to the present invention is reflected from first mirror 28 onto first curved mirror 36 and reflected therefrom at an angle. A displaced ray of light 33 that has been displaced by application of an electric field is reflected from first mirror 28 at a different point onto first curved mirror 36 and then reflected therefrom at an angle different from that of normal ray 31. The angular difference 34 between a normal ray 31 and displaced ray of light 33 allows the two lights to be directed to two different points. Using the arrangement shown in FIG. 5, a multiplexer/demultiplexer or a scanner may be constructed as described above with reference to the embodiment shown in FIG. 4.

Figure 6:
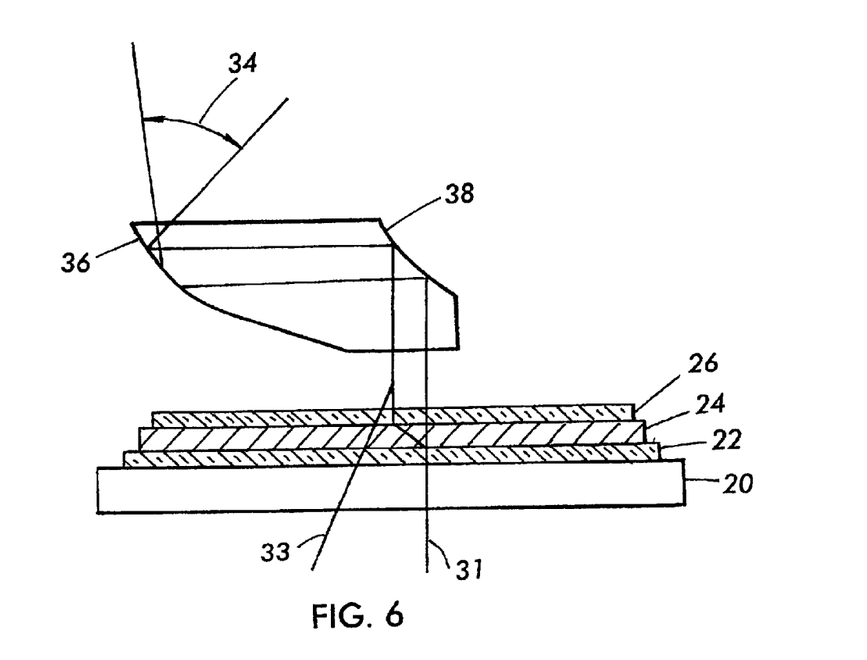
FIG. 6 shows a directional optical coupler according to the first embodiment of the present invention with a reflective separation multiplier of a third variety.

FIG. 6 shows yet another arrangement which may be used to construct a multiplexer/demultiplexer. Referring to FIG. 6, a reflective separation multiplier comprising of first curved mirror 36 and second curved mirror 38, which is opposite first curved mirror 36, is disposed near and spaced by an air gap from an optical cell according to the invention. First curved mirror 36 and second curved mirror 38 may be mirror regions that are deposited on a surface of an optical element such as a prism.

A normal ray 31 of light emerging from an optical cell according to the invention is reflected from second curved mirror 38 onto first curved mirror 36 and reflected therefrom at an angle. A displaced ray 33 of light that has been displaced by application of an electric field is reflected from second curved mirror 38 at a different point onto first curved mirror 36 and then reflected therefrom at an angle. The angular difference 34 between normal ray 31 and displaced ray of light 33 allows the two lights to be directed to two different points. Using the arrangement shown in FIG. 6, a multiplexer/demultiplexer may be constructed as described above with reference to the embodiment shown in FIG. 4.

A directional optical coupler according to the second embodiment as shown in FIG. 3 may be used in conjunction with a reflective selection multiplier according to the arrangements shown in FIGS. 4, 5 and 6 instead of a directional optical coupler according to the first embodiment as shown in FIG. 2 to obtain the same advantageous results described above.

The reflective separation multipliers shown in the embodiments of FIGS. 4, 5 and 6 can be Free Space devices, waveguides or made by a thin film. In the Free Space version the reflective separation multiplier consists of three mirrored facets on an asymmetrical pentaprism with specific angular relationships and physical lengths. In the waveguide and thin film modes, the mirrors are deposited on facets. In the waveguide mode the mirror is deposited as a thin film directly on the facet. In the thin film version the thin film mirror is deposited on the surface of a solid prism. The prism in the preferred embodiment has three non adjacent surfaces containing the critical angular relationship for creating the reflective separation multiplier by total internal reflection (TIR). Preferably, the input and output port regions have anti-reflection coatings.

In addition, output beam separation can be increased by utilizing one or more reflective curved surfaces in lieu of plane facets on the prism.

It is also practical to fabricate the cell structure of FIGS. 2 and 3 directly on the input face of the device. This can be visualized by looking at FIGS. 4, 5, and 6 and eliminating the air gap and substrate. Further it is practical to add a second deflector to the output of the reflective separation multiplier increase the separation even further and provide independent control of the secondary beam separator.

A further enhancement can be obtained by constructing the prism out of a single crystal of SBN and adding field electrodes. This creates a prism with a variable index of refraction.

In cases where the input beam diameter is too large for proper device operation, an input lens system is provided to reduce the beam diameter. This input lens is positioned between the input fiber and the first cell of a directional optical coupler of the present invention.

It should also be noted that if an optical cell according to the present invention is driven with bi-polar signals, it is possible to double the angle of deviation. This can be accomplished by changing the control circuitry.

Figure 7:
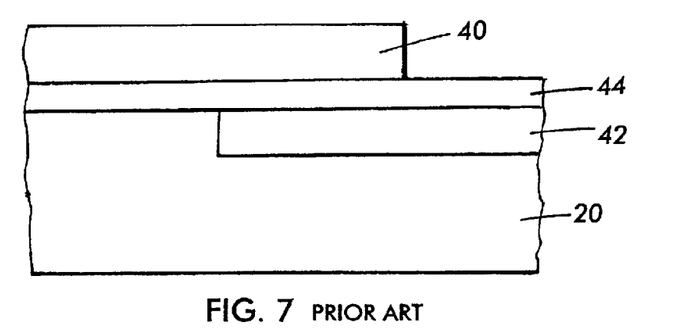
FIG. 7 shows a cross-sectional view of a portion of a tunneling optical matrix according to prior art.

An optical cell according to the present invention may also be used in an optical switching matrix. The switching in an optical switching matrix according to prior art is based on selectively controlled optical tunneling between planar waveguides using phase coherent synchronous coupling through the isolation layer which has defined switching regions implemented in an electro-optical material. A conventional arrangement which uses optical tunneling between a pair of planar waveguides is shown in FIG. 7. Referring to FIG. 7, there are disposed on a substrate 2: a conventional tunneling optical coupler includes first planar waveguides 40; second planar waveguide 42; and isolation layer 44 disposed between first planar waveguide 40 and second planar waveguide 42.

Figure 8:
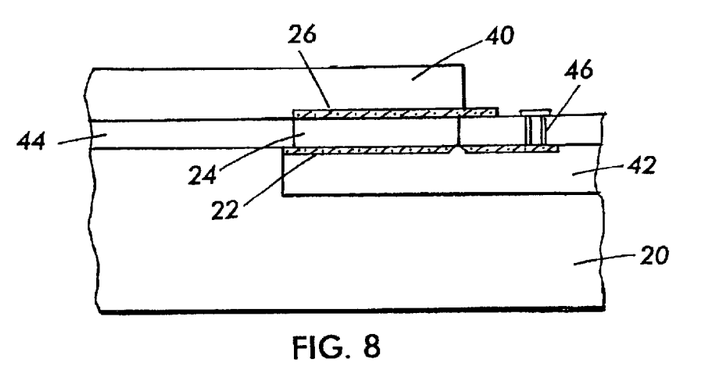
FIG. 8 shows a cross-sectional view of a portion of tunneling optical matrix in which an optical cell according to the present invention is interposed between two planar waveguides.

FIG. 8 shows an arrangement in which an optical cell according to the present invention is interposed between first planar waveguide 40 and second planar waveguide 42. First planar waveguide 40 is spaced from second planar waveguide 42 close enough to allow for evanescent mode coupling. An optical cell according to the present invention replaces a portion of isolation layer 44 thus making it possible to selectively allow or disallow optical tunneling to occur between first planar waveguide 40 and second planar waveguide 42. According to an aspect of the present invention, second planar waveguide 42 is buried in substrate 20 just below the top surface of substrate 20 such that the top surface of second planar waveguide 42 is flush with the top surface of substrate 20. The optical cell according to the present invention is disposed over a portion of second waveguide 42 such that its top surface is substantially flush with the top surface of isolation layer 44. According to another aspect of the present invention first planar waveguide 40 is formed above the surface in the form of a ridge. This type of arrangement is advantageous in that it allows for a cost effective manufacture of a three dimensional device. Preferably, via 46 may be used to connect transparent conductor 22 to the top surface where it may be connected to a control device (not shown) for selective application of a voltage to vary the index of refraction of index of refraction variable layer 24 in order to selectively allow or disallow tunneling.

In order to describe the theory of operation of a tunneling optical switching matrix that employs an optical cell according to the present invention, it is necessary to establish some conventions. Referring to FIG. 7, each element has an index of refraction which can be denoted with its respective numeral. Thus, the index of refraction of first planar waveguide 40, isolation layer 44, second planar waveguide 42 and substrate 20 can be represented by $n_{40}$, $n_{44}$, $n_{42}$ and $n_{20}$ respectively. The mathematical relationship between the indices of these layers is given by:

$$n_{44} > n_{20} > n_{44}$$

where: $n_{20}$ and $n_{44}$ can be equal
and: $n_{40} = n_{42}$

In the case where $n_{20}$ and $n_{44}$ are equal, the device is called a Symmetrical Waveguide. When $n_{20}$ and $n_{44}$ are unequal, the device is called an Asymmetrical Waveguide. The present invention can be incorporated in either device.

When two waveguides are brought into extremely close proximity coupling will occur through phase coherent energy transfer (optical tunneling). The indices $n_{40}$ and $n_{42}$ in the guiding layers must be larger than $n_{44}$, and $n_{20}$, and the thickness of the confining layer must be small enough that the evanescent tails of the guided modes overlap. In order for energy transfer to occur between the two guides, they must have identical propagation constants. Thus, the indices and the thicknesses of the waveguiding layers must be very carefully controlled to provide matching propagation constants. In the case of other devices embodying the synchronous coupling principle such as the prism coupler, the interaction length must be carefully chosen for optimum coupling. The condition for total transfer of energy between the waveguides is analyzed by the theory of weakly coupled modes which provides that a complete interchange of energy between phase-matched modes occurs if the interaction length in the z direction satisfies the relation:

$$kL = \pi/2$$

where: k=coupling coefficient
L=interaction length

The present invention is based on the disruption of the delicate balance necessary to allow tunneling by changing the index of refraction of the isolation layer 44. By choosing an electro-optical material that exhibits a change in index of refraction under the application of an electric field, and using it in the isolation layer 44 where two planar waveguides cross over one another, a switching action will occur when the electric field is applied.

The switch can be made to operate in either "normally open" or "normally closed" modes of operation by choosing appropriate indices of refraction for each of the layers to orchestrate the necessary conditions to either support or deny coupling in the "rest" (no electric field applied) state.

Figure 9:
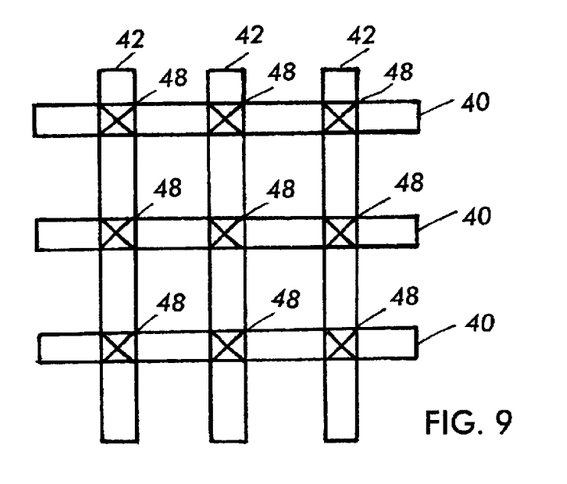
FIG. 9 schematically shows a top view of a tunneling optical matrix in which optical cells according to the present invention are used to optically link rows and columns of planar waveguides.

The arrangement shown by FIG. 8 may be employed in a matrix (crossed) arrangement as shown in FIG. 9. Referring to FIG. 9, a plurality of planar waveguides 40 are arranged in rows disposed over a plurality of waveguides 42 that are arranged in columns. Waveguides 40 preferably cross over waveguides 42 at a ninety degree angle. An optical cell is disposed between waveguides 40 and waveguides 42 at their respective crossing points 48, according to the arrangement shown in FIG. 8, so that it may selectively optically link the two.

Figure 10:
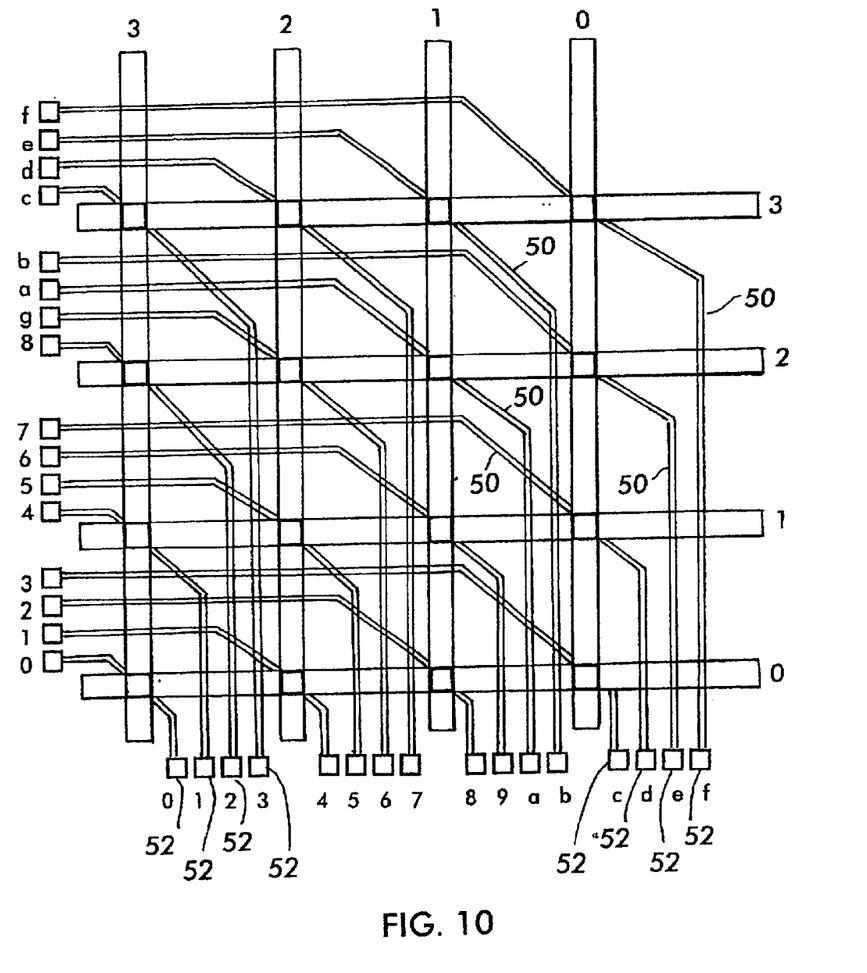
FIG. 10 schematically shows a top view of a tunneling optical matrix in which optical cells according to the present invention are used to optically link rows and columns of planar waveguides and includes a plurality runners that connect the electrodes of the optical cells to respective external contacts.

Referring to FIG. 10, in a preferred embodiment, a plurality of conductive runners 50 may be provided to connect transparent conductors 22, 26 to respective electrical contacts 52 for external connection to a control device (not shown) that is used to apply a voltage between associated transparent conductors 22, 26.

In its preferred embodiment, an optical cell according to the invention is manufactured using silicon or glass as a substrate and conventional semiconductor type CMOS processing. Photolithographic masking is used to define the various regions during processing. In the preferred embodiment, the transparent conductors 22, 26 are typically Indium-Tin oxide (90% Indium Oxide: 10% Tin Oxide) for operation in the near Infra-red and Visible bands. The Active Electro-Optic layer is any material with appropriate optical characteristics that exhibits a change in index of refraction under the application of an electric field. The waveguides may be formed by any process that yields a waveguide of sufficient quality.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An optical coupler comprising:
   a first planar waveguide on a first plane;
   a second planar waveguide on a second plane over said first plane; and
   an electro-optic device interposed between said first planar waveguide and said second planar waveguide; said electro-optic device including:
   a first optically transparent electrode;
   a second optically transparent electrode; and
   an electro-optic layer interposed between said first optically transparent electrode and said second optically transparent electrode, said electro-optic layer having an index of refraction that is substantially variable only along one crystal axis upon application of an electric field and negligible along other crystal axes for said electric field.

2. An optical coupler according to claim 1, wherein said first planar waveguide crosses over said second planar waveguide at an angle, and wherein said electro-optic device selectively links said first planar waveguide and said second planar waveguide optically.

3. An optical coupler according to claim 1, wherein said first planar waveguide crosses over said second planar waveguide at a 90 degree angle, and wherein said electro-optic device selectively links said first planar waveguide and said second planar waveguide optically.

4. An optical coupler according to claim 1, further comprising a via to connect one of said optically transparent electrodes to an external contact.

5. An optical coupler according to claim 1, wherein a plurality of said first planar waveguides are arranged along one direction and a plurality of said second planar waveguides are oriented along a direction orthogonal to said first direction and disposed at a position spaced above said first planar waveguides, and further comprising a plurality of said electro-optic devices, each device optically linking a first planar waveguide to a second planar waveguide.

6. An optical coupler according to claim 5, wherein said first planar waveguides are spaced from said second planar waveguides close enough to allow for evanescent mode coupling.

7. An optical coupler according to claim 5, wherein said first planar waveguides are ridges, and said second planar waveguides are buried in a substrate just below the surface of said substrate such that the top surfaces of said second planar waveguides are flush with the surface of said substrate.

8. An optical coupler comprising:
 a plurality of first planar waveguides;
 a plurality of second planar waveguides; and
 an electro-optic device interposed between each first planar waveguide and each second planar waveguide; each electro-optic device including:
 a first optically transparent electrode;
 a second optically transparent electrode; and
 an electro-optic layer interposed between said first optically transparent electrode and said second optically transparent electrode, said electro-optic layer having an index of refraction that is substantially variable only along one crystal axis upon application of an electric field and negligible along other crystal axes for said electric field, wherein said plurality of first planar waveguides are arranged along one direction and said plurality of second planar waveguides are oriented along a direction orthogonal to said first direction, and disposed at a position spaced above said plurality of first planar waveguides, and wherein each electra-optic device is capable of optically linking a first planar waveguide to a second planar waveguide.

9. An optical couper according claim 8, wherein said first planar waveguides are spaced from said second planar waveguides close enough to allow for evanescent mode coupling.

10. An optical coupler according to claim 8, wherein said first planar waveguides are ridges, and said second planar waveguides are buried in a substrate just below the surface of said substrate such that the top surfaces of said second planar waveguides is flush with the surface of said substrate.

11. An optical coupler according to claim 1, wherein said waveguides are free of polymer cladding.

* * * * *